(12) United States Patent
Yokomichi et al.

(10) Patent No.: US 6,291,810 B1
(45) Date of Patent: Sep. 18, 2001

(54) IMAGE SENSOR

(75) Inventors: Masahiro Yokomichi; Yukito Kawahara; Satoshi Machida, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/299,468

(22) Filed: Apr. 26, 1999

(30) Foreign Application Priority Data

Apr. 28, 1998 (JP) .................................................. 10-119645

(51) Int. Cl.[7] .................................................. H01L 27/146
(52) U.S. Cl. ..................................... 250/208.1; 250/214 A
(58) Field of Search .......................... 250/208.1, 214 A, 250/214 R; 348/300, 301; 358/444, 443, 482, 483; 327/306, 307, 333; 257/291, 292

(56) References Cited

U.S. PATENT DOCUMENTS

| | | | |
|---|---|---|---|
| 4,564,864 | * | 1/1986 | Maeshima .............................. 358/444 |
| 5,315,102 | * | 5/1994 | Abe et al. ............................ 250/208.1 |
| 5,557,121 | * | 9/1996 | Kozuka et al. ........................ 257/292 |
| 6,002,287 | * | 12/1999 | Ueno et al. ............................ 327/307 |

* cited by examiner

Primary Examiner—John R. Lee
(74) Attorney, Agent, or Firm—Adams & Wilks

(57) ABSTRACT

A voltage at an output terminal of a photodiode is reset to a fixed voltage and an output signal of the photodiode and a dummy signal matching a dark output signal is output by a dummy photodiode comprising an identical component as that of the photodiode. The voltage difference between an input side and an output side of an amplifier is made to match the difference between a reset voltage of the photodiode and a reset voltage of a common signal line and a reset voltage of an output terminal to optimize the size of a MOS transistor forming the amplifier. The offset voltage is set to a constant which does not depend on the size of the MOS transistor. The amplifier is formed with CMOS devices and is selectively operated only during an output operation to suppress the current consumption.

20 Claims, 10 Drawing Sheets

IMAGE SENSOR

BACKGROUND OF THE INVENTION

The present invention relates to an one-dimensional image sensor for converting the reflected light from a manuscript which is irradiated with light into an electrical signal and can be applied to an image reading apparatus such as a FAX.

FIG. 10 is a circuit diagram showing a configuration of a contact type one-dimensional image sensor IC which is used in a conventional image reading apparatus for use in a FAX. As shown in FIG. 10, the conventional image reading apparatus is such that the output signals outputted from phototransistors P1 to Pn are read out to a common signal line 1 by turning on successively switches S1 to Sn. In this connection, reference symbol AMP designates an amplifier for amplifying the output signals which are outputted from the phototransistors P1 to Pn.

The contact type phototransistor one-dimensional image sensor as described above is disclosed in Japanese unexamined patent application publication S61-124171(1986).

SUMMARY OF THE INVENTION

However, in such a one-dimensional image sensor, there arises a problem in that since the carriers remaining in the base of the phototransistor are removed through the emitter of the phototransistor, the base electric potential can not be sufficiently reset to the initial state and hence the residual image is remarkable.

In the light of the foregoing, the present invention was made in order to solve the above-mentioned problem associated with the prior art, and it is therefore an object of the present invention to provide an image sensor which is inexpensive, has smaller residual image and is capable of obtaining the effective bright output with accuracy.

In order to solve the above-mentioned problem, the image sensor according to the present invention is designed as follows.

According to the present invention, there is provided an image sensor which is constructed by arranging and mounting linearly a plurality of linear image sensor ICs, wherein a unit light receiving circuit includes: a photodiode acting as a light receiving element; an amplifier for amplifying a signal outputted from the photodiode; and a reading switch for reading out an output signal of the amplifier, and the image sensor IC is constructed in such a way that output signals, each varying depending on the amount of received light, from the plurality of unit light receiving circuits are read out successively in the order of the arrangement of the unit light receiving circuits to a signal output terminal therethrough.

In addition, in the above-mentioned image sensor IC, a first electrode of a reset switch is connected to a common signal line, an electric potential at a second electrode of the reset switch is fixed to an electric potential giving an initial electric potential by which the state of the photodiode is reset to the initial state, and the reset switch is temporarily closed when an image signal is outputted therethrough and is opened or closed in such a way that the electric potential of the common signal line is rapidly brought close to the initial electric potential.

In addition, preferably, a reference voltage circuit may be configured in terms of a configuration of the amplifier circuit in such a way that the difference between the electric potential inputted to the amplifier and the electric potential outputted from the amplifier is equal to the difference between the electric potential by which the state of the photodiode is made the initial state and the initial electric potential by which the common signal line is reset due to the back gate effect of a MOS transistor.

In addition, a first electrode of another reset switch is connected to an output terminal, an electric potential at a second electrode of the another reset switch is fixed to the electric potential giving an initial electric potential by which the state of another amplifier is reset to the initial state, and the another reset switch is temporarily closed when outputting therethrough an image signal and is opened or closed in such a way that the electric potential at the signal output terminal is rapidly brought close to the initial electric potential. As a result, against even the increase of the external load capacity which occurs when connecting a plurality of linear image sensor ICs linearly, the electric potential at the signal output terminal can be rapidly brought close to the initial electric potential.

In addition, if the amplifiers start, after having been sufficiently stabilized, their amplifying operations a fixed time period before an image signal of the light receiving element which is arranged in the first stage of the image sensor starts to be outputted, and complete their amplifying operations after the operation of outputting an image signal of the light receiving element which is arranged in the final stage thereof has been completed and the state of that light receiving element is returned back to the initial state, since those amplifiers are operated stably and selectively, those amplifiers serve so as to provide the less current consumption.

An output signal is read out to a dummy signal output terminal through a dummy photodiode, an amplifier for amplifying a signal outputted from the dummy photodiode and a reading switch for reading out therethrough the output signal. An electric potential at an electrode of a reset switch is fixed to the electric potential giving the initial electric potential by which the state of the dummy photodiode is reset to the initial state at all times. The reset switch is temporarily closed when an image signal is outputted and is opened or closed in such a way that the electric potential of the common signal line is rapidly brought close to the initial electric potential. In addition, a first electrode of another reset switch is connected to a dummy signal output terminal, and an electric potential at a second electrode of the reset switch is fixed to the electric potential giving the initial electric potential by which the reset is always made to the initial state. These circuit configurations and the circuit constants are respectively made identical to those of the circuit for outputting an image signal from the photodiode acting as the light receiving element, and the same signal as the output signal in the dark state is outputted.

An image sensor according to the present invention is designed in such a way that a photodiode is used as a light receiving element of a unit block and an amplifier is connected to the photodiode within the block so that the terminal voltage of the photodiode varying depending on the amount of received light is outputted successively in the form of an image signal through the amplifier, and also a dummy photodiode is provided which has the same configuration as that of the unit block of the light receiving element and the state of which is reset to the initial state at all times and which outputs a dummy signal equal to an output signal in the dark state of the photodiode as the light receiving element, thereby enabling the difference between the image signal output and the dummy output signal to be obtained.

DESCRIPTION OF THE PREFERRED EMBODIMENTS

The present invention will hereinafter be described in detail with reference to the accompanying drawings.

Figure 1:
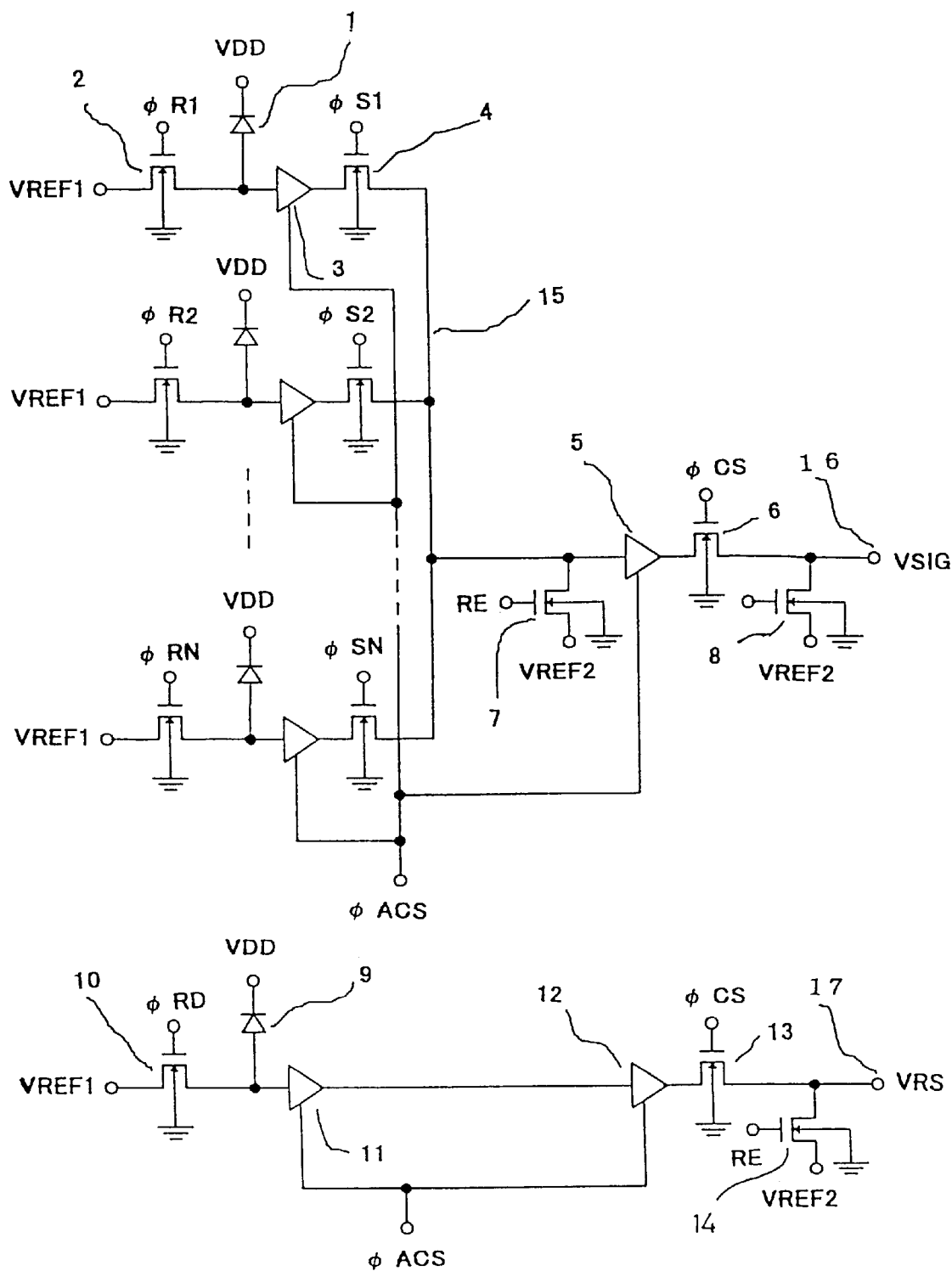
FIG. 1 is a circuit diagram showing a configuration of an image sensor according to the present invention.

FIG. 1 is a circuit diagram showing a configuration of an image sensor according to the present invention.

An N type region underlying a first electrode of a photodiode 1 acting as a light receiving element is connected to a power source having a power source voltage VDD, and a P type region of a second electrode of the photodiode 1 is connected to a drain of a first electrode of a MOS transistor 2 acting as a first reset switch by which the state of the photodiode 1 is returned back to the initial state and is connected to an input terminal of a first amplifier 3. A first reference voltage VREF 1 is supplied to a source of a second electrode of the MOS transistor 2. An output terminal of the amplifier 3 is connected to a common signal line 15 through a MOS transistor 4 acting as a reading switch. In this connection, a plurality of blocks each of which has perfectly the same configuration as that of the block of the above-mentioned unit light receiving circuit are provided by the number which is equal to at least the number of output bits.

The signal on the common signal line 15 is, in order to further amplify the signal which has been outputted to the common signal line 15, inputted to a second amplifier 5. The common signal line 15 is connected to a drain of a first electrode of a MOS transistor 7 acting as a second reset switch by which the state of the common signal line 15 is returned back to the initial state, and a second reference voltage VREF 2 is supplied to a source of a second electrode of the MOS transistor 7. The output terminal of the amplifier 5 is connected to an output terminal 16 for outputting an image signal through a MOS transistor 6 acting as a chip selecting switch for selectively functioning the second amplifier. Against the increase of the external load capacity which occurs in the case where a plurality of image sensor ICs are connected, the output terminal 16 is connected to a drain of a first electrode of a MOS transistor 8 acting as a third reset switch by which the state of the output terminal 16 is returned back to the initial state. Also, the reference voltage VREF 2 is supplied to a source of a second electrode of the MOS transistor 8. In this connection, in the present invention, since change in the electric potential of the photodiode depending on the amount of received light is outputted through the amplifier to the outside, the operating speed can also be remarkably increased due to the performance of the amplifier, and since the common signal line 15 is provided in the inside of the linear image sensor IC, the internal wiring capacity is increased to limit the reading speed as compared with the well known CCD image sensor. Then, in order to further increase the reading speed, there is provided the MOS transistor as the second reset switch by which the state of the common signal line 15 is temporarily brought close to the initial state. When outputting the initial electric potential during the operation of resetting each of the unit light receiving circuits through the common signal line 15, the MOS transistor 7 as the second reset switch is temporarily caused to conduct to be operated in such a way that the electric potential of the common signal line 15 is rapidly brought close to the initial electric potential. In addition, against the increase as well of the external load capacity which occurs in the case where a plurality of linear image sensor ICs are connected, in order to obtain the same effect, the MOS transistor 8 as the third reset switch is temporarily caused to conduct to be operated in such a way that the electric potential at the output terminal 16 is rapidly brought close to the initial electric potential. By adopting such a circuit configuration, the initial electric potential can be stably outputted even in the high speed operation and also the degradation of the picture quality can be suppressed.

Next, the dummy output system will hereinbelow be described. An N type region of a first electrode of a dummy photodiode 9 is connected to the power source having the power source voltage VDD, and a P type region of a second electrode of the photodiode 9 is connected to a drain of a first electrode of a MOS transistor 10 acting as a first dummy reset switch by which the state of the photodiode 9 is returned back to the initial state, and is connected to an input terminal of a first dummy amplifier 11. Also, the reference voltage VREF 1 is supplied to a source of a second electrode of the MOS transistor 10. The output signal of the amplifier 11 is directly inputted to a second dummy amplifier 12 and the output terminal of the amplifier 12 is connected to an output terminal 17, through which the dummy signal is outputted, through a MOS transistor 13 acting as a dummy chip select switch by which them amplifier is selectively functioned. Alike the output terminal 16, against the increase of the external load capacity which occurs in the case where a plurality of image sensor ICs are connected, the output terminal 17 is connected to a drain of a first electrode of a MOS transistor 14 acting as a second dummy reset switch by which the state of the output terminal 17 is returned back to the initial state. Also, the reference voltage VREF 2 is supplied to a source of a second electrode of the MOS transistor 14. In this connection, the photodiodes 1 and 9 are designed with perfectly the same size, the MOS transistors 2 and 10 are designed with perfectly the same size, the amplifiers 3 and 11 are also designed with perfectly the same size, and the amplifiers 5 and 12 are also designed with perfectly the same size.

Figure 2:
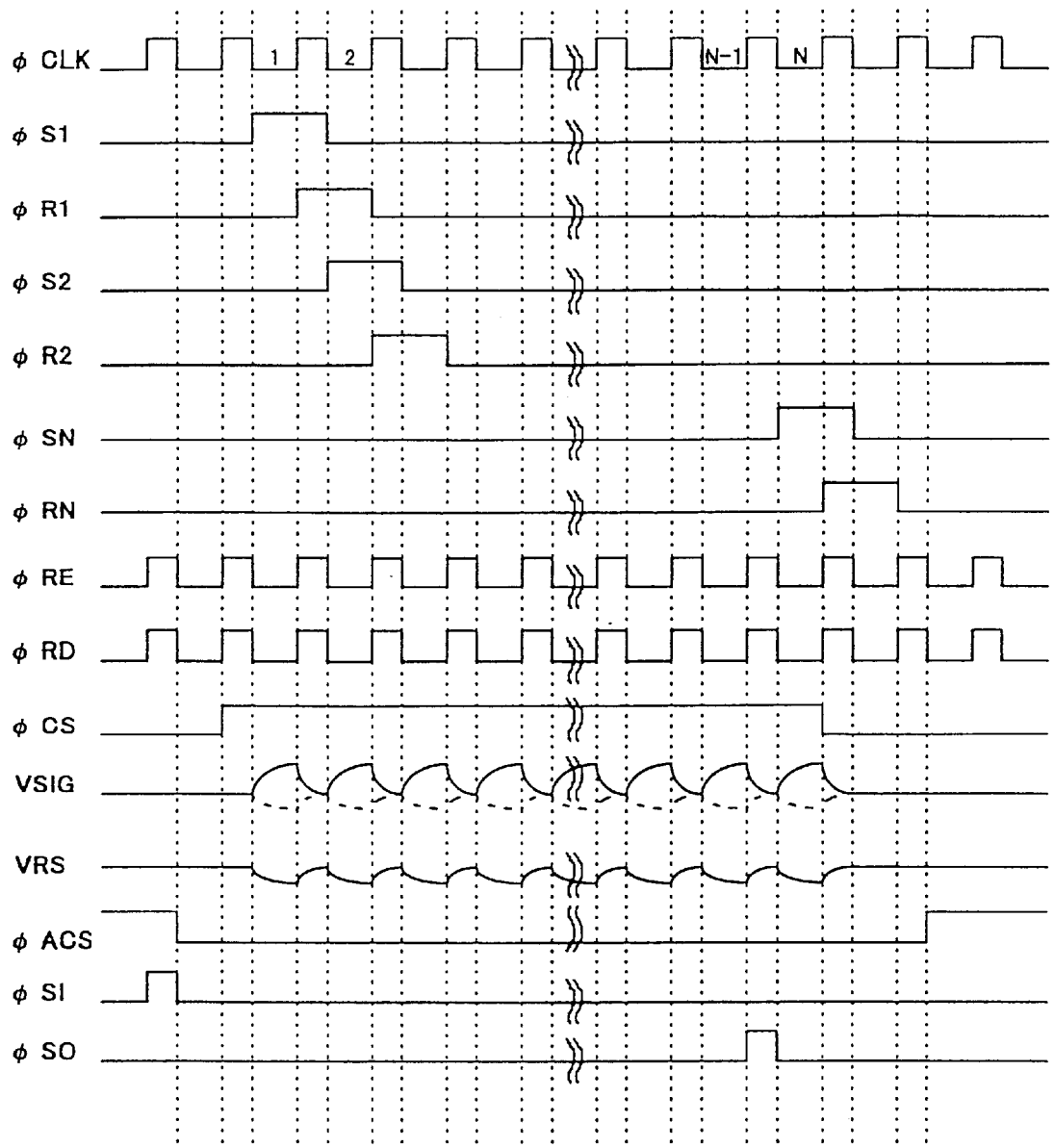
FIG. 2 is a timing chart useful in explaining the operation of the image sensor according to the present invention.

FIG. 2 is a timing chart useful in explaining the operation of the image sensor according to the present invention.

At the time when a pulse signal φS1 goes to HIGH synchronously with the clock signal, the pulse signals φS1 to φSN are inputted successively to the gates of the MOS transistors 4 of the respective bits after a lapse of one clock, and then the output signals of the photodiode 1 in the respective bits are read out to the common signal line 15. After the delay of a half clock with respect to pulse signal φS1, the gate of the MOS transistor 2 in the first bit is turned on on the basis of a pulse signal φR1 and then the electric potential at the P type region of the photodiode 1 is reset to the electric potential of VREF 1. Likewise, the P type regions of the photodiodes 1 on and after the second bit are also successively reset to the electric potential of VREF 1. At the time when φRl goes to LOW, the MOS transistor 2 is turned off and the P type region of the photodiode 1 becomes the floating state. The electric potential at the P type region of the photodiode 1 right after the MOS transistor 2 has been turned off is slightly lower than that of the reference voltage VREF 1. This is due to the switching noises which are generated when the gate of the MOS transistor 2 is turned off. But, since the difference in the electric potential therebetween is small, the output value which is obtained by reading out to the output terminal 16 the electric potential, when the P type region of the photodiode 1 is reset to the voltage of the reference voltage VREF 1, through the amplifiers 3 and 5 can be regarded as the value which is substantially the same as the output signal in the dark state. At the time when light is made incident to the photodiode 1 after the gate of the MOS transistor 2 is turned off, a current is caused to flow from the P type region to the N type region of the photodiode 1 due to the generated carriers, and then the electric potential at the P type region of the photodiode 1 is increased gradually. Next time the MOS transistor 4 is turned on, the electric potential of the common signal line 15 nears gradually the output voltage of the amplifier 3 corresponding to the electric potential at the P type region of the photodiode 1 at this time. Next, at the time when φRE goes to HIGH, the MOS transistor 7 is turned on and then the electric potential of the common signal line 15 is reset to the reference voltage VREF 2.

For a time period when φS1 goes to HIGH and φCLK goes to LOW right after φS1 goes to HIGH, and the output of the final bit is completed, and further for 1.5 clocks thereafter φACS is held LOW, the amplifiers 3 and 5 carry out their amplifying operations at all times. Since this leads to that in the case where a plurality of ICs are connected, the amplifiers are selectively operated, it is also effective to the reduction of the current consumption. Since a time period is required to stabilize the output signals of the amplifiers 3 and 5, φACS goes to LOW one clock before the photodiode 1 starts to output the signal, and then goes to HIGH after the operation of resetting the final stage photodiode N has been completed in order to prevent the influence by the electric potential fluctuation when the amplifying operation has been completed. In addition, in the case where a lapse of one clock is insufficient for the time period required to stabilize the output signals of the amplifiers 3 and 5 in the high speed operation, that time period may also be set longer than one clock in correspondence with the operating frequency.

For a time period ranging from a time point a half clock before φS1 goes to HIGH up to a time point when the output of the final bit is completed, φCS is held HIGH and the MOS transistor 6 is turned on, and also the output signal of the common signal line 15 is amplified by the amplifier 5 to be read out to the output terminal 16.

In such a way, the photodiode is employed as the light receiving element and the electric potential at the second electrode of the photodiode which varies depending on the amount of received light is read out to the outside through the amplifiers, whereby the photodiode is hardly influenced by the switching noises due to the operation of the reading switch and the chip selecting switch and the noises due to the capacity across the lines. In addition, the photodiode is employed as the light receiving element, and the second electrode the electric potential at which varies depending on the amount of received light is given the initial electric potential through the reset switch, after having read out the signal therefrom, to return the state of the second electrode back to the initial state, whereby the degradation of the picture quality such as the residual image due to the residual electric charges which has been common among conventional image sensors having the phototransistor as the light receiving element is greatly improved, and hence the excellent picture quality is obtained.

The gate of the MOS transistor 10 is, on the basis of the pulse signal φRD, held in the on state at all times for a time period when CLK is HIGH, and also even if light is made incident to the photodiode 9, the P type region of the photodiode 9 is reset to the voltage of the reference voltage VREF 1 to be in the initial state at all times. At the time when φRD goes to LOW, the MOS transistor 10 is turned off and then the P type region of the photodiode 9 becomes the floating state. The electric potential at the P type region of the photodiode 9 right after the MOS transistor 10 is turned off is slightly lower than that of the reference voltage VREF 1. This results from the switching noises which are generated when the gate of the MOS transistor 10 is turned off. But, since the difference in the electric potential therebetween is small, the value of the output signal which is obtained by reading out the electric potential of the reference voltage VREF 1 to which the P type region of the photodiode 9 is reset to the output terminal 17 through the amplifiers 11 and 12 can be regarded as substantially the same as the voltage of the output signal in the dark state which is read out to the output terminal 16.

The output signal of the photodiode 9 is inputted to the amplifier 12 through the amplifier 11 at all times, and the amplifiers 11 and 12 carry out, similarly to the amplifiers 3 and 5, their amplifying operations continue at all times for a time period when φACS is held LOW. For a time period ranging from a time point a half clock before φS1 goes to HIGH up to a time point when the operation of outputting the final bit has been completed, φCS is held HIGH and the MOS transistor 13 is turned on so that the output signal of the photodiode 9 is read out to the output terminal 17.

Figure 3:
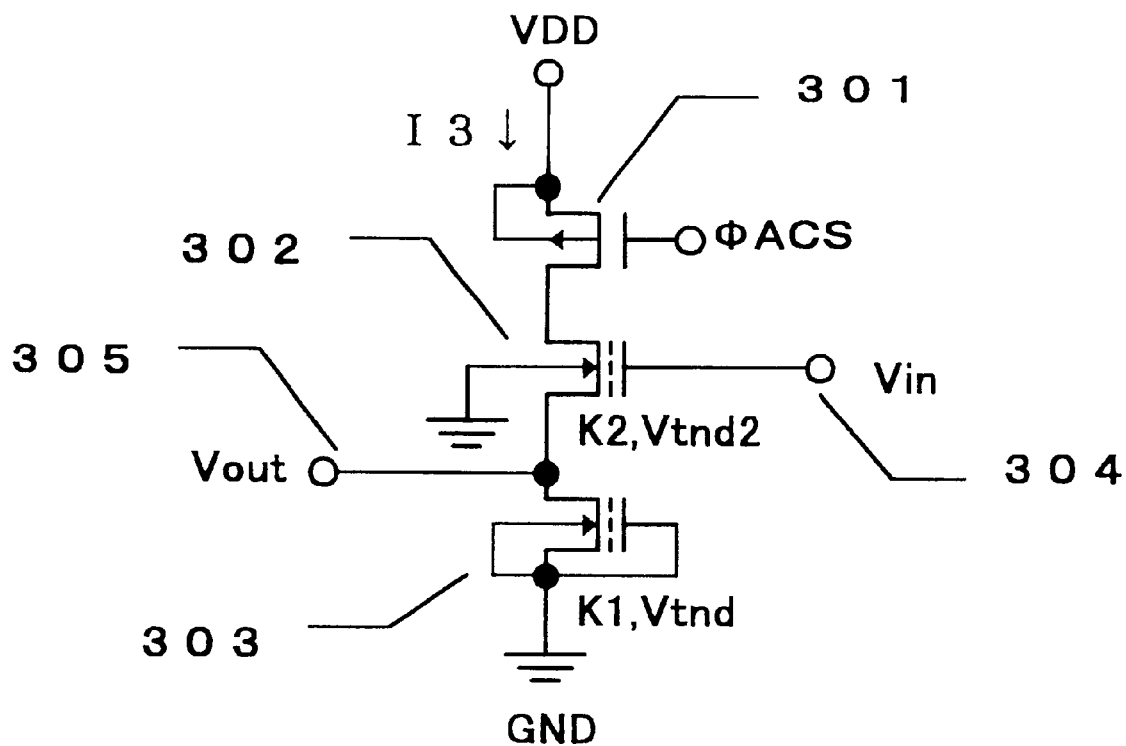
FIG. 3 is a circuit diagram showing a configuration of each of a first amplifier 3 and an amplifier 11 of the image sensor according to the present invention.

FIG. 3 is a circuit diagram showing a configuration of each of the amplifiers 3 and 11 of the image sensor according to the present invention. A MOS transistor 301 is an enhancement type P-channel MOS transistor, and a source of a first electrode of the MOS transistor 301 and a substrate thereof are both connected to VDD, and also a gate of a second electrode thereof is connected to φACS.

A MOS transistor 302 is a depletion type N-channel MOS transistor and a source of a first electrode of the MOS transistor 302 is connected to a drain of a third electrode of the MOS transistor 301 and a substrate thereof is connected to GND.

A MOS transistor 303 is a depletion type N-channel MOS transistor and a drain of a first electrode of the MOS transistor 303 is connected to a drain of a second electrode of the MOS transistor 302 and a gate of a second electrode, a substrate and a source of a third electrode thereof are all connected to GND.

In this connection, a gate of a third electrode of the MOS transistor 302 forms an input terminal 304 of the amplifier 3, and the drains of the MOS transistors 302 and 303 form an output terminal 305 of the amplifier 3.

The setting is carried out in such a way that as shown in FIG. 2, for a time period when φACS is held LOW, the gate voltage of the MOS transistor 301 is GND and during the operation, the MOS transistor 301 is in the on state at all times, and the diffusion current is always predominant in the current which is caused to flow through the MOS transistors 302 and 303. Since the MOS transistors 302 and 303 are operated in the saturation region, substantially the fixed current I3 is caused to flow therethrough irrespective of the source to drain voltage thereof.

Assuming that the channel width of the MOS transistor is W, the channel length thereof is L, the mobility of carriers is $\mu$ and the electrostatic capacity per unit area of the gate oxide film is Cox, then the electric conductivity coefficient K of the MOS transistor is expressed as follows.

$$K = W/L \cdot \mu \cdot Cox \quad (1)$$

Assuming that the input voltage to the amplifier is Vin, the output voltage therefrom is Vout, the electric conductivity coefficient of the MOS transistor 302 is K2, the threshold voltage thereof is Vtnd2, the electric conductivity coefficient of the MOS transistor 303 is K1, and the threshold voltage thereof is Vtnd, then the current I3 which is caused to flow through the MOS transistors 302 and 303 is expressed as follows.

$$I3 = \tfrac{1}{2} \cdot K2 \ (Vin - Vout + Vtnd2)^2 = \tfrac{1}{2} \cdot K1 \cdot Vtnd^2 \quad (2)$$

Also, the output voltage Vout of the amplifier 3 is expressed as follows.

$$Vout = Vin + Vtnd2 - \sqrt{K1/K2} \cdot Vtnd \quad (3)$$

In addition, assuming that the threshold voltage which varies due to the back gate effect of the MOS transistor 302 is Δ Vtnd, then the following equation is established.

$$Vtnd2 = (Vtnd - \Delta Vtnd) \quad (4)$$

Therefore, Expression can be transformed as follows.

$$Vout = Vin + Vtnd - \Delta Vtnd - \sqrt{K1/K2} \cdot Vtnd \quad (5)$$

Figure 4:
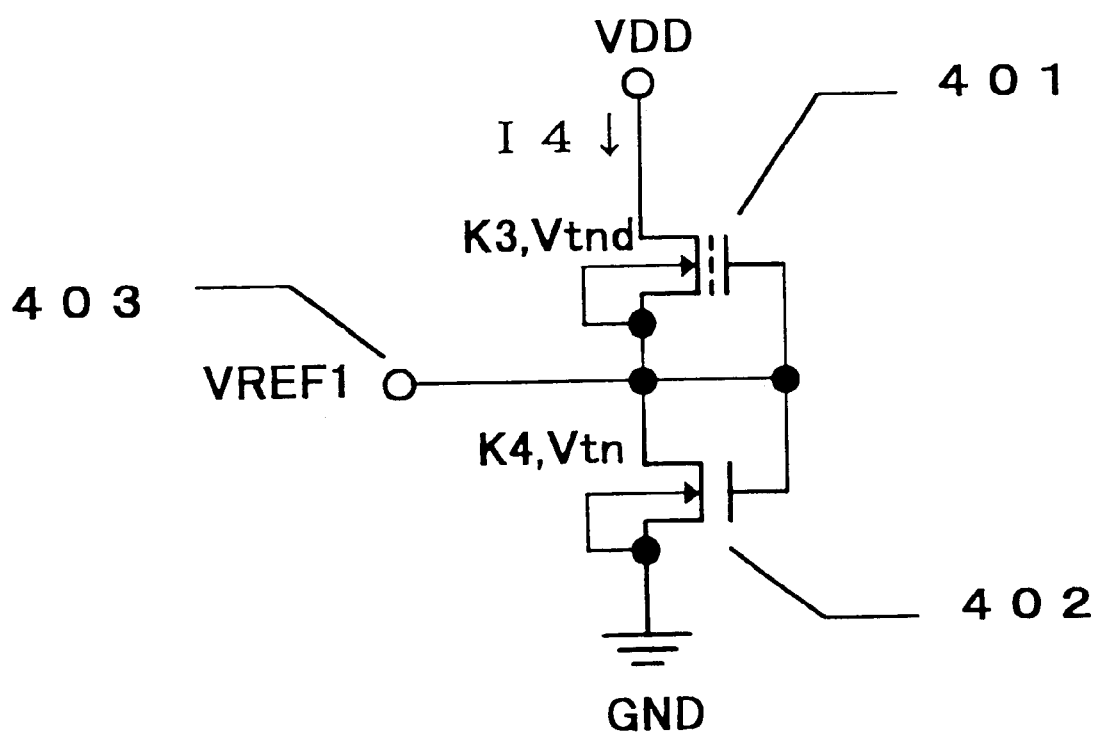
FIG. 4 is a circuit diagram showing a configuration of a first reference voltage generating circuit 1 of the image sensor according to the present invention.

FIG. 4. is a circuit diagram showing a configuration of a first reference voltage generating circuit of the image sensor according to the present invention.

A MOS transistor 401 is a depletion type N-channel MOS transistor and a drain of a first electrode of the MOS transistor 401 is connected to VDD. A MOS transistor 402 is an enhancement type N-channel MOS transistor, and a drain of a first electrode and a gate of a second electrode of the MOS transistor 402 are both connected to a substrate as well as a gate of a second electrode and a source of a third electrode of the MOS transistor 401. Also, a source of a first electrode and a substrate of the MOS transistor 402 are both connected to GND. An output terminal 403 of the reference voltage generating circuit 1 is connected to the gate of the second electrode, the source of the third electrode and the substrate of the MOS transistor 401 as well as to the gate of the second electrode and the drain of the third electrode of the MOS transistor 402. In this connection, when the MOS transistors 401 and 402 are operated in the saturation region, substantially the fixed current I4 is caused to flow therethrough irrespective of the source to drain voltage thereof.

Assuming that the output voltage of the reference voltage generating circuit is VREF 1, the electric conductivity coefficient of the MOS transistor 402 is K4, the threshold voltage thereof is Vtn, the electric conductivity coefficient of the MOS transistor 403 is K3, and the threshold voltage thereof is Vtnd, then the current I4 which is caused to flow through the MOS transistors 402 and 403 is expressed as follows.

$$I4 = K3 \ Vtnd = K4 \ (VREF \ 1 - Vtn)^2 \quad (6)$$

Also, the first reference voltage VREF 1 of the reference voltage generating circuit 1 is expressed as follows.

$$VREF \ 1 = Vtn + \sqrt{K3/K4} \ Vtnd \quad (7)$$

Now, since as shown in FIG. 2, the input voltage Vin of the amplifier 3 in the reset operation is reset to the electric potential of the reference voltage VREF 1 of the reference voltage generating circuit 1, the output voltage Vout of the amplifier 3 which is in the initial state is expressed as follows.

$$Vout = Vtn + \sqrt{K3/K4} \cdot Vtnd + Vtnd - \Delta Vtnd - \sqrt{K1/K2} \cdot Vtnd \quad (8)$$

Now, by setting the ratio to a constant in such a way that for the values of Ks of the MOS transistors, K1:K2=K3:K4 is established, Expression 8 can be transformed as follows.

$$Vout = Vtn + Vtnd - \Delta Vtnd \quad (9)$$

In such a way, the MOS transistors 302 and 303 of the amplifier 3 can be laid out within the common P type well by making each of the electric potentials at the substrates of the MOS transistors 302 and 303 the common electric potential, i.e., GND. As a result, the area of the block of the unit light receiving circuit can be decreased. In addition, since there is no dependency on the channel width and the channel length of the MOS transistor, the fluctuation can be reduced.

Figure 5:
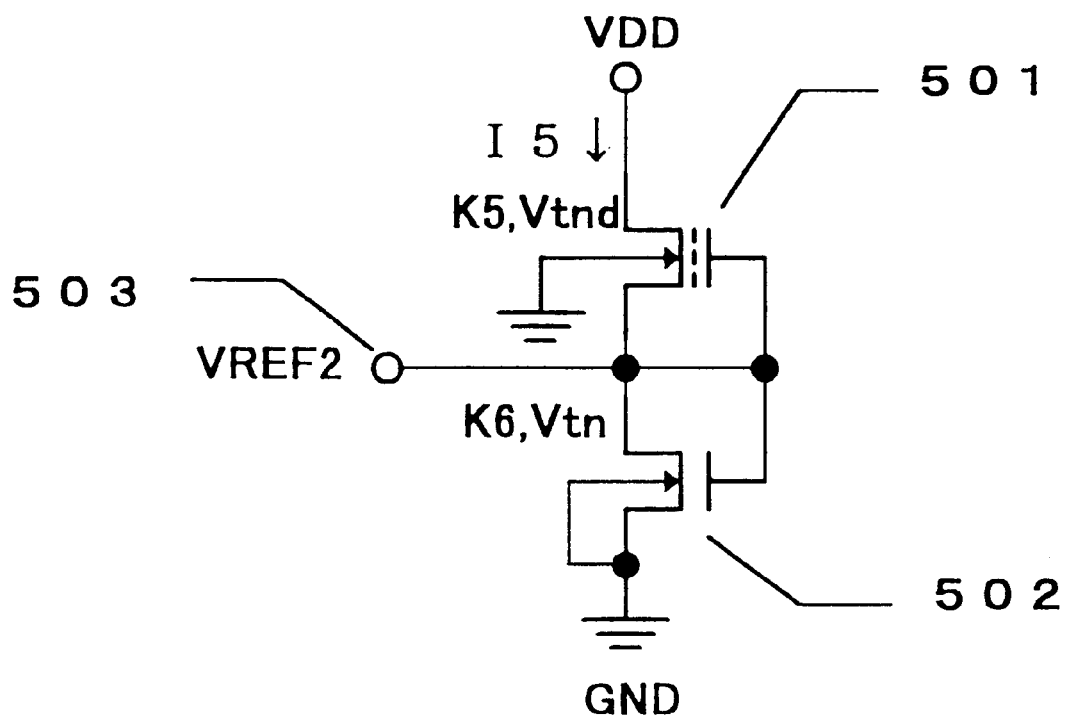
FIG. 5 is a circuit diagram showing a configuration of a second reference voltage generating circuit 2 of the image sensor according to the present invention.

FIG. 5 is a circuit diagram showing a configuration of a second reference voltage generating circuit of the image sensor according to the present invention.

A MOS transistor 501 is a depletion type N-channel MOS transistor and a drain of a first electrode thereof is connected to VDD and a substrate thereof is connected to GND. A MOS transistor 502 is an enhancement type N-channel MOS transistor, and a drain of a first electrode and a gate of a second electrode are both connected to a gate of a second electrode and a source of a third electrode of the MOS transistor 501. Also, a source of a third electrode and a substrate of the MOS transistor 502 are both connected to GND. An output terminal 503 of the reference voltage generating circuit is connected to a gate of a second electrode, a source of a third electrode and a substrate of the MOS transistor 501 as well as to the gate of the second electrode and the drain of the third electrode of the MOS transistor 502.

Since the MOS transistors 501 and 502 are operated in the saturation region, substantially the fixed current I4 is caused to flow therethrough irrespective of the source to drain voltage thereof.

Assuming that the output voltage of the reference voltage circuit is VREF 2, the electric conductivity coefficient of the MOS transistor 502 is K6, the threshold voltage thereof is Vtn, the electric conductivity coefficient of the MOS transistor 503 is K5, and the threshold voltage thereof is Vtnd5, then the current I5 which is caused to flow through the MOS transistors 502 and 503 is expressed as follows.

$$I5 = K5\ Vtnd5^2 = K6\ (VREF\ 2 - Vtn)^2 \tag{10}$$

Also, the second reference voltage VREF 2 of the reference voltage generating circuit is expressed as follows.

$$VREF\ 2 = Vtn + \sqrt{K5/K6}\,Vtnd5 \tag{11}$$

Now, assuming that the threshold voltage which varies due to the back gate effect of the MOS transistor 501 is Δ Vtnd, then the following equation is established.

$$Vtnd5 = Vtnd - \Delta Vtnd \tag{12}$$

Therefore, Expression 11 can be transformed as follows.

$$VREF\ 2 = Vtn + \sqrt{K5/K6}\ (Vtnd - \Delta Vtnd) \tag{13}$$

In addition, by setting the values of Ks of the MOS transistors in such a way that the relation of K5=K6 is established, the reference voltage VREF 2 of the reference voltage generating circuit as the electric potential with which the common signal line 15 is reset is expressed as follows.

$$VREF\ 2 = Vtn + Vtnd - \Delta Vtnd \tag{14}$$

As shown in FIGS. 1 and 3, for the output voltage of the photodiode the state of which has become the initial state with the reference voltage VREF 1, the output voltage Vout of each of the amplifiers 3 and 11 of which output voltage varies due to the back gate effect of the MOS transistor 302 of the internal circuit of each of the amplifiers 3 and 11 can be set equal to the reference voltage VREF 2 of the reference voltage generating circuit as follows.

$$Vout = VREF\ 2 \tag{15}$$

Figure 6:
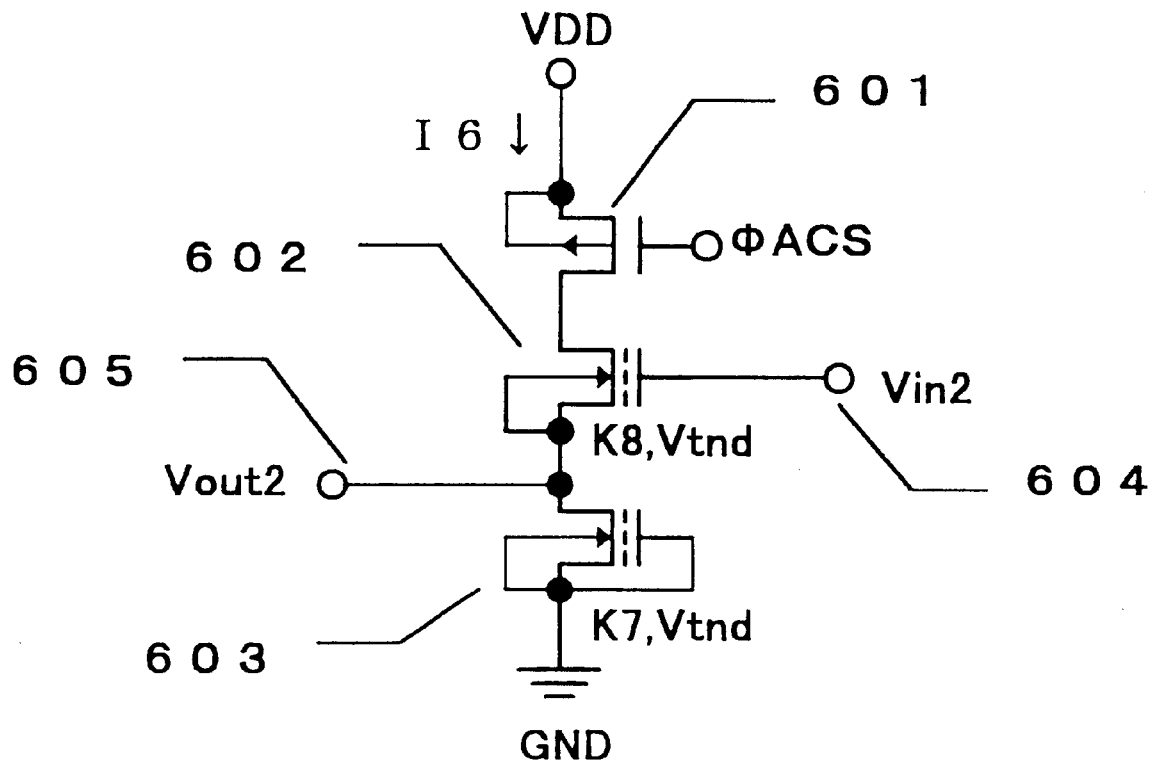
FIG. 6 is a circuit diagram showing a configuration of each of a second amplifier 5 and an amplifier 12 of the image sensor according to the present invention.

FIG. 6 is a circuit diagram showing a configuration of each of the amplifiers 5 and 12 of the image sensor according to the present invention. A MOS transistor 601 is an enhancement type P-channel MOS transistor, and a source of a first electrode and a substrate of the MOS transistor 601 are both connected to VDD and a gate of a second electrode thereof is connected to φACS.

In addition, a MOS transistor 602 is a depletion type N-channel MOS transistor, and a source of a first electrode of the MOS transistor 602 is connected to a drain of a third electrode of the MOS transistor 601.

Also, a MOS transistor 603 is a depletion type N-channel MOS transistor, and a drain of a first electrode of the MOS transistor 603 is connected to a drain of a second electrode and a substrate of the MOS transistor 602 and a gate of a second electrode, a substrate and a source of a third electrode thereof are all connected to GND.

A gate of a third electrode of the MOS transistor 602 forms an input terminal 604 of the amplifier 3, and drains of the MOS transistors 602 and 603 form an output terminal 605 of the amplifier 3.

The setting is carried out in such a way that as shown in FIG. 2, for a time period when φACS is held LOW, the gate voltage of the MOS transistor 601 is made GND and during the operation, the MOS transistor 601 is in the on state at all times, and the diffusion current is always predominant in the current which is caused to flow through the MOS transistors 602 and 603. Since the MOS transistors 602 and 603 are operated in the saturation region, substantially the fixed current I6 is caused to flow therethrough irrespective of the source to drain voltage thereof.

Assuming that the input voltage to each of the amplifiers 5 and 12 is Vin 2, the output voltage therefrom is Vout2, and the electric conductivity coefficient of the MOS transistor 602 is K8, then the threshold voltage thereof is Vtnd due to absence of the back gate effect. Also, assuming that the electric conductivity coefficient of the MOS transistor 603 is K7, then the threshold voltage thereof is Vtnd. Therefore, the current I6 which is caused to flow through the MOS transistors 602 and 603 is expressed as follows.

$$I6 = \tfrac{1}{2} \cdot K8\ (Vin2 - Vout2 + Vtnd)^2 = \tfrac{1}{2} \cdot K7 \cdot Vtnd^2 \tag{16}$$

Also, an output voltage Vout2 of each of the amplifiers 5 and 11 is expressed as follows.

$$Vout2 = Vin2 + Vtnd - \sqrt{K7/K8}\cdot Vtnd \tag{17}$$

In addition, by setting the values of Ks of the MOS transistors in such a way that the relation of K7=K8 is established, the following equation is established.

$$Vout2 = Vin2 \tag{18}$$

Therefore, the input voltage to each of the amplifiers 5 and 12 becomes equal to the output voltage therefrom.

In addition, each of the amplifiers 3 and 11 may have the same circuit configuration as that of each of the amplifiers 5 and 12. In this case, the following relation is established.

$$Vout = Vin \tag{19}$$

Also, when the P type region of the photodiode 1 is reset to the electric potential of the first reference voltage VREF 1 as shown in FIG. 2, the following relation is established.

$$Vout = VREF\ 1 \tag{20}$$

Therefore, the second reference voltage VREF 1 is applied to the source of the second electrode of the MOS transistor 7 acting as the second reset switch by which the state of the common signal line 15 is returned back to the initial state. In addition, the first reference voltage VREF 1 may also be applied to the source of the second electrode of the MOS transistor 8 acting as the third reset switch of the output terminal.

Figure 7B:
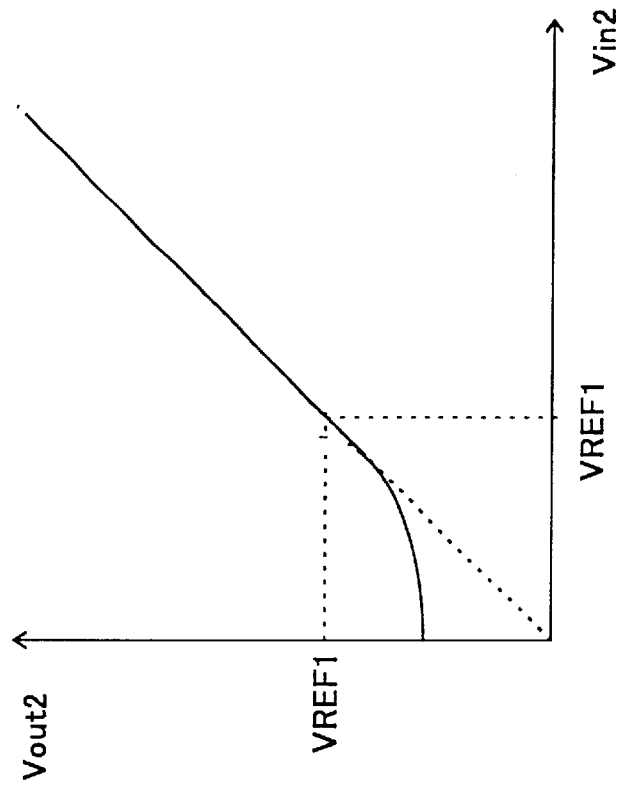
FIG. 7A and FIG. 7B is a graphical representation useful in explaining the input/output characteristics of each of the amplifiers 3 and 11 and each of the amplifiers 5 and 12 of the image sensor according to the present invention.
Figure 7A:
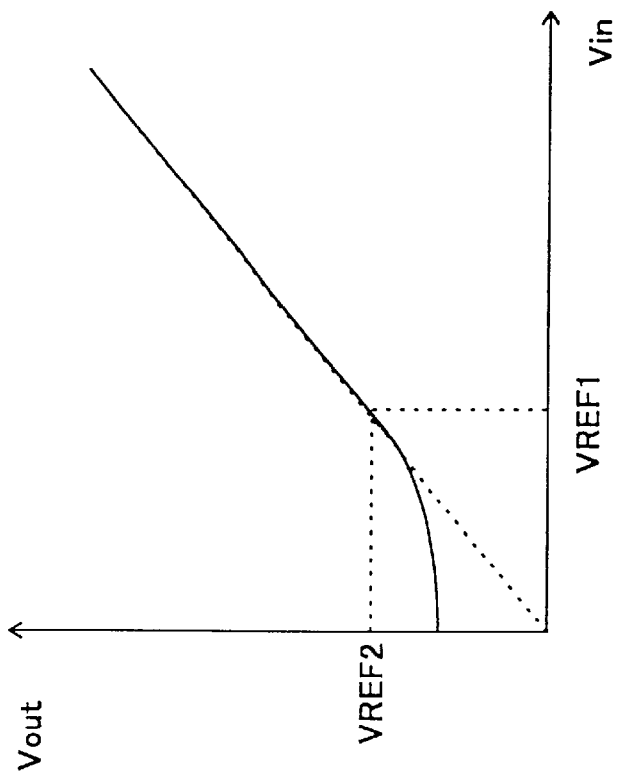

FIG. 7A and FIG. 7B is a graphical representation useful in explaining the input/output characteristics of each of the amplifiers 3 and 11 and each of the amplifiers 5 and 12 of the image sensor according to the present invention.

As shown in FIGS. 3 and 6, the depletion type N-channel MOS transistor is employed on the input side of the amplifier, and hence the linear input/output characteristics can not be obtained in the non-saturation operation region. For this reason, as shown in FIG. 1, the reference voltage in the initial state of the photodiode is set to VREF 1 and as a result the operation in the linear region becomes possible. In addition, since for the depletion type N-channel MOS transistor, the diffusion current is predominant in the saturation region of the MOS, the initial electric potential can be stably outputted against the fluctuation of the power supply voltage VDD, and also the degradation of the picture quality can be suppressed by making GND the reference voltage for the output signal.

Figure 8:
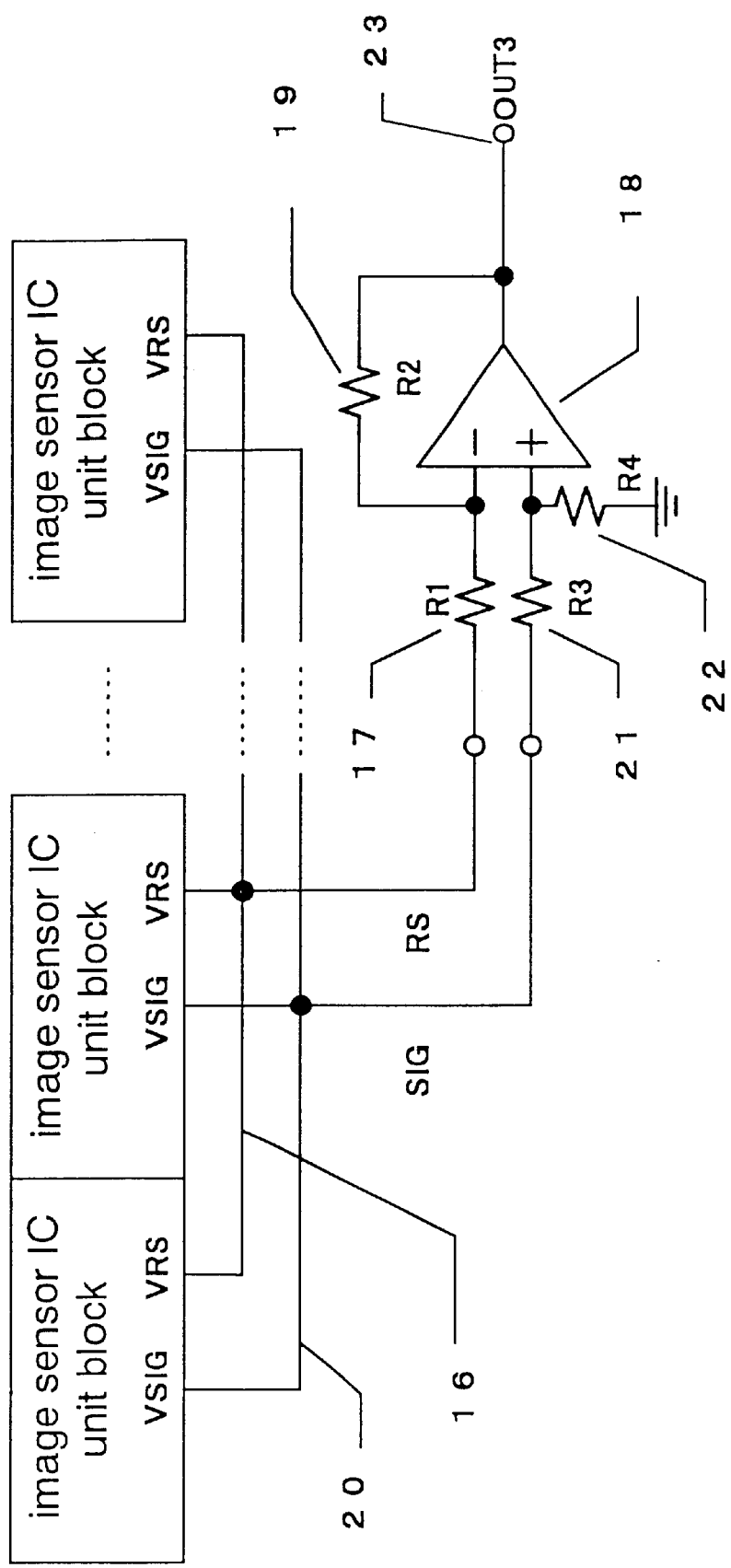
FIG. 8 is a circuit diagram showing a configuration of an example of a circuit using a dummy output signal of the image sensor according to the present invention.
Figure 9:
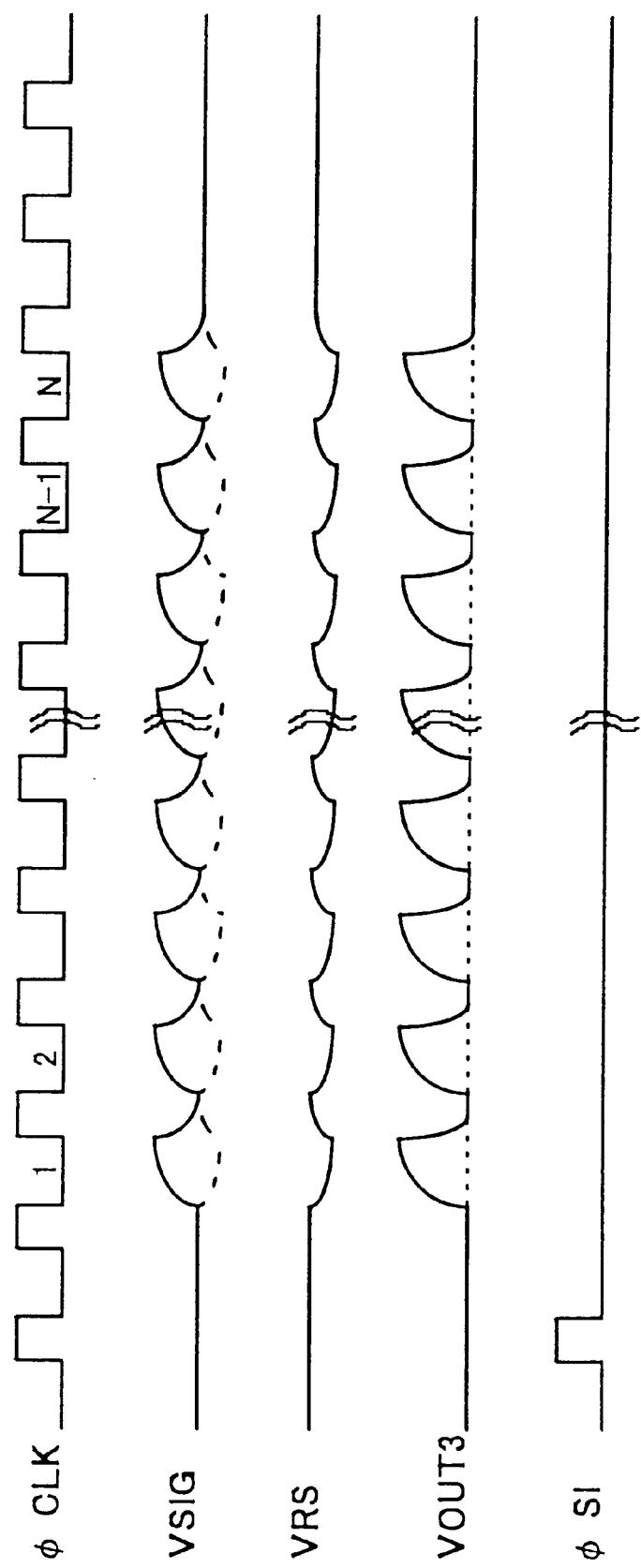
FIG. 9 is a timing chart useful in explaining the operation of the circuit using the dummy output signal of the image sensor according to the present invention.
Figure 10:
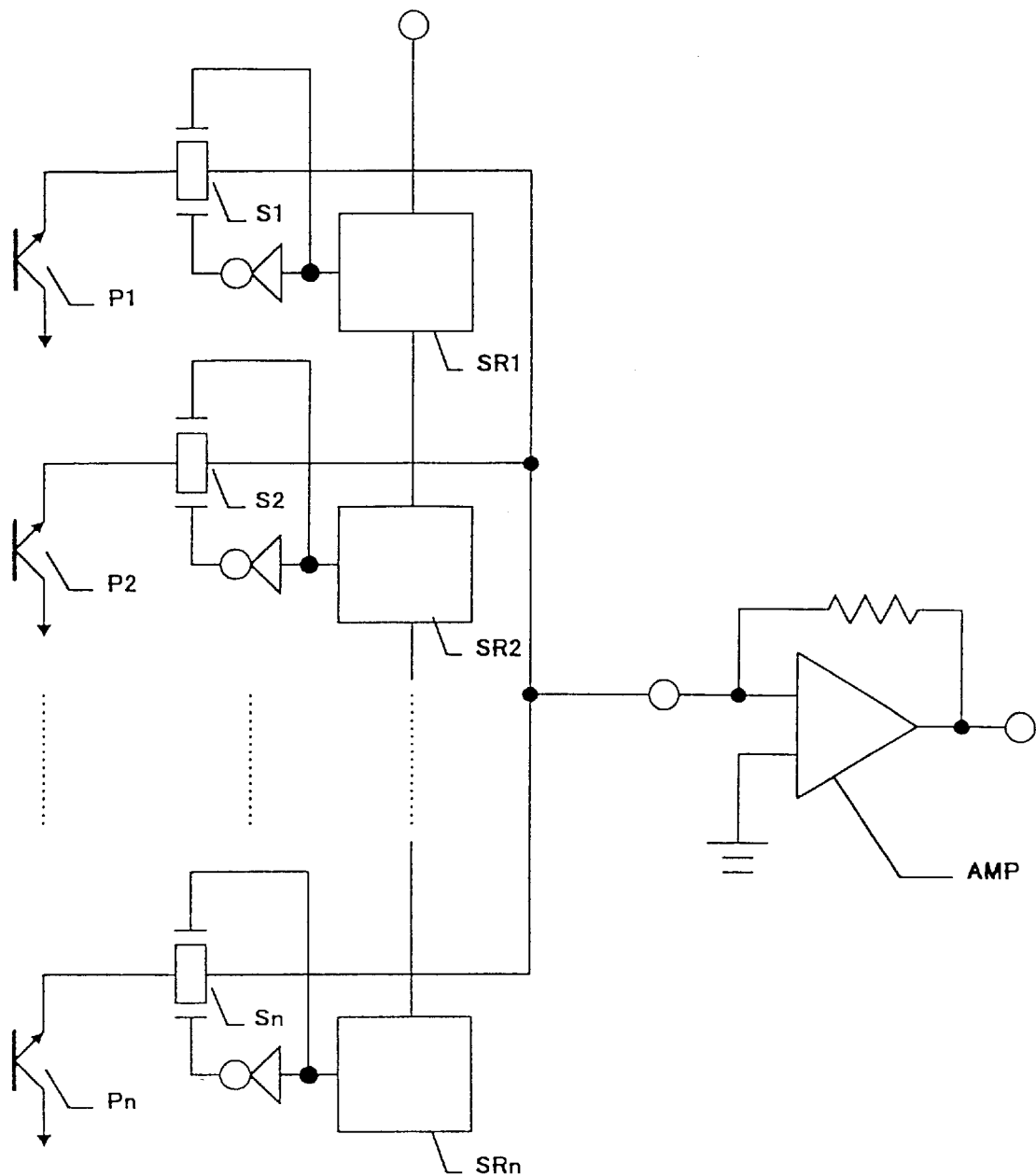
FIG. 10 is a circuit diagram showing a configuration of a conventional image sensor.

FIG. 8 is a circuit diagram showing a configuration of an example of a circuit in which the dummy output of the image sensor according to the present invention is employed, and FIG. 9 is a timing chart useful in explaining the operation of the circuit shown in FIG. 8. Also, in FIG. 8, the image sensor IC of the present invention is shown as the unit block. In this connection, the illustration of the input and output terminals including the power source other than the output terminal 16 and the output terminal 17 is omitted here for the sake of simplicity. In FIG. 8, a plurality of image sensor ICs each having the unit block is connected. The output terminals 17 through which the dummy signals are respectively outputted are connected to a common line 18 which is in turn connected to an inverted input terminal of an operational amplifier 20 through a first resistor 19. In addition, a second resistor 21 is connected between the inverted input terminal of the operational amplifier 20 and an output terminal OUT3. Next, the output terminals 16 through which the image signals are respectively outputted are connected to a common line 22 which is in turn connected to a non-inverted input terminal of the operational amplifier 20 through a third resistor 23. In addition, a fourth resistor 24 is connected between the inverted input terminal of the operational amplifier 20 and GND. In such away, the subtraction circuit of the operational amplifier is applied to the circuit of interest shown in FIG. 8. Then, assuming that the resistance value of the resistor 19 is R1, the resistance value of the resistor 21 is R2, and the resistance value of the resistor 23 is R3, and the resistance value of the resistor 24 is R4, and also the relations of R1=R3 and R2=R4 are established, the following eqution is established.

$$VOUT3 = R3/R1 \cdot (VSIG - VDS) \tag{21}$$

Thus, by obtaining the difference output between the image signal output and the dummy signal output, the voltage in the initial state of the photodiode 1 shown in FIG. 1 can be set to substantially the electrical potential of GND. In addition, by removing the switching noises which the MOS transistor 2 generates, the fluctuation due to the process fluctuation in the threshold voltage Vtnd of the depletion type N-channel MOS transistors constituting the amplifier and the reference voltage generating circuit, and the fluctuation due to the process fluctuation in the threshold voltage Vtn of the enhancement type N-channel MOS transistor constituting the reference voltage generating circuit, it is possible to reduce the fluctuation of the dark output. In addition, if the gain of the operational amplifier is increased, then the sensitivity can be enhanced. As a result, the image sensor which is excellent in the S/N ratio can be obtained with the lower cost.

As set forth hereinabove, according to the present invention, it is possible to provide an image sensor which is inexpensive and has the small residual image and which is capable of suppressing the dark level deviation by outputting a dummy voltage as a voltage which is obtained when initializing a photodiode and which is substantially the same in level as a dark output voltage to obtain a difference between an image signal output and the dummy signal output to remove the fluctuation of threshold voltages of MOS transistors due to the process fluctuation. In addition, the less power consumption and the high speed operation can be made possible.

What is claimed is:

1. An image sensor comprising: a plurality of linear image sensor ICs arranged linearly, each having a plurality of unit light receiving circuits, each unit light receiving circuit comprising a photodiode acting as a light receiving element; a first amplifier for amplifying a signal output by the photodiode; a reading switch for reading out therethrough an output signal of the first amplifier; and a first reset switch for returning the photodiode back to an initial state; wherein an electric potential at a first electrode of the photodiode is a fixed electric potential, a second electrode of the photodiode the electric potential of which varies depending on the amount of received light is connected to an input terminal of the first amplifier, an output terminal of the first amplifier is connected to an input terminal of the reading switch, an output terminal of the reading switch is connected to an output terminal of the reading switch of another unit light receiving circuit through a common signal line, a first electrode of the first reset switch is connected to a second electrode of the photodiode, and an electric potential at a second electrode of the first reset switch is fixed to a first electric potential that is an initial electric potential; and wherein each of the linear image sensor ICs further comprises a scanning circuit for scanning the reading switch and the reset switch of each of the unit light receiving circuits in such a way that the output signals, each varying depending on the amount of received light, from the plurality of unit light receiving circuits which are arranged linearly are read out successively in the order of arrangement of the unit light receiving circuits to a signal output terminal; a second amplifier for further amplifying the signal read out from the common signal line; and a chip selecting switch for selectively controlling the second amplifier.

2. An image sensor according to claim 1; further comprising a second reset switch having a first electrode connected to the common signal line, and a second electrode fixed to a second electric potential serving as an initial electric potential to which the state of the photodiode is reset to an initial state; wherein the second reset switch is temporarily closed when outputting through the common signal line the initial electric potential during the operation of resetting each of the unit light receiving circuits, and is opened or closed in such a way that the electric potential of the common signal line is rapidly brought close to the initial electric potential.

3. An image sensor according to claim 2; wherein the difference between the electric potential supplied to the first amplifier and the electric potential output by the first amplifier is equal to the difference between the first electric potential supplied to the second electrode of the first reset switch and the second electric potential supplied to the second electrode of the second reset switch.

4. An image sensor according to claim 1; further comprising a third reset switch having a first electrode connected to an output terminal of the second amplifier, and a second electrode fixed to a second electric potential giving an initial electric potential to which the state of the output signal of the second amplifier is reset to the initial state; wherein the third reset switch is temporarily closed when outputting therethrough the initial electric potential during an operation of resetting each of the unit light receiving circuits to a signal output terminal, and is opened or closed in such a way that the electric potential at the signal output terminal is rapidly brought close to the initial electric potential.

5. An image sensor according to claim 4; wherein the difference between the electric potential supplied to the first amplifier and the electric potential output by the first amplifier is equal to the difference between the first electric potential supplied to the second electrode of the first reset switch and the second electric potential supplied to the second electrode of the third reset switch.

6. An image sensor according to claim 1; wherein the first amplifier and the second amplifier start amplifying operations a fixed time period before an image signal of the light receiving element which is arranged in a first stage of the image sensor starts to be output.

7. An image sensor according to claim 1; wherein the first amplifier and the second amplifier finish amplifying operations after the operation of outputting an image signal of the light receiving element which is arranged in a final stage of the image sensor has been completed, and then the state of the light receiving element is returned back to the initial state.

8. An image sensor according to claim 1; further comprising a dummy output system comprising a dummy photodiode acting as a dummy element; a third dummy amplifier for amplifying a signal output by the dummy photodiode; a fourth reset switch for returning the state of the dummy photodiode back to an initial state; a fourth dummy amplifier, an electric potential at a first electrode of the dummy photodiode being a fixed electric potential, a second electrode of the dummy photodiode being connected to an input terminal of the third amplifier, and an output terminal of the third amplifier being connected to an input terminal of the fourth dummy amplifier; a chip selecting switch for selectively activating the fourth amplifier; and a fifth reset switch having a second electrode fixed to the second electric potential giving the initial electric potential to which the state of the output signal of the fourth amplifier is reset to the initial state; and wherein the linear image sensor comprises at least a fourth reset switch which is temporarily closed when the fifth reset switch outputs the initial electric potential during the operation of resetting the dummy photodiode to a dummy signal output terminal and which is opened or closed in such a way that the electric potential at the dummy signal output terminal is rapidly brought close to the initial electric potential.

9. An image sensor according to claim 8; wherein the photodiode acting as the light receiving element and the dummy photodiode each have the same circuit constant, the first amplifier and the third amplifier each have the same circuit constant, the first reset switch and the fourth reset switch each have the same circuit constant, and the third reset switch and the fifth reset switch each have the same circuit constant.

10. An image sensor having one or more linear image sensor ICs, comprising: a plurality of unit light receiving circuits arranged in each of the linear image sensor ICs, each of the unit light receiving circuits comprising a photodiode for receiving incident light and producing a corresponding output signal, a first amplifier for amplifying the output signal of the photodiode, a reading switch for reading out an output signal of the first amplifier, and a first reset switch for returning the photodiode to an initial state; and wherein the linear image sensor ICs each further comprises a common signal line for output signals of each of the unit light receiving circuits; a scanning circuit for scanning the reading switch and the reset switch so that output signals of the photodiodes which vary depending on the amount of light received thereby are read out successively to a signal output terminal; a second amplifier for further amplifying the signal read out from the common signal line; and a chip selecting switch for selectively controlling the second amplifier.

11. An image sensor according to claim 10; wherein a potential at a first electrode of the photodiode is fixed; a second electrode of the photodiode having a potential which varies in accordance with an amount of received light is connected to an input terminal of the first amplifier; an output terminal of the first amplifier is connected to an input terminal of the reading switch; an output terminal of the reading switch is connected to an output terminal of the reading switch of another unit light receiving circuit through the common signal line; a first electrode of the first reset switch is connected to a second electrode of the photodiode; and a potential at a second electrode of the first reset switch is fixed to a an initial electric potential.

12. An image sensor according to claim 10; further comprising a second reset switch having a first electrode connected to the common signal line, and a second electrode fixed to a second electric potential serving as an initial electric potential to which the photodiode is reset to an initial state; wherein the second reset switch is temporarily closed when the initial electric potential is output through the common signal line during the operation of resetting each of the unit light receiving circuits, and is opened or closed so that the potential of the common signal line is rapidly brought close to the initial electric potential.

13. An image sensor according to claim 12; wherein the difference between the potential supplied to the first amplifier and the potential output by the first amplifier is equal to the difference between the first potential supplied to the second electrode of the first reset switch and the second potential supplied to the second electrode of the second reset switch.

14. An image sensor according to claim 10; further comprising another reset switch having a first electrode connected to an output terminal of the second amplifier, and a second electrode fixed to a second potential giving an initial potential to which the state of the output signal of the second amplifier is reset to an initial state; wherein the other reset switch is temporarily closed when the initial potential is output therethrough during an operation of resetting each of the unit light receiving circuits to a signal output terminal, and is opened or closed so that the potential at the signal output terminal is rapidly brought close to the initial potential.

15. An image sensor according to claim 14; wherein the difference between the potential supplied to the first amplifier and the potential output by the first amplifier is equal to the difference between the first potential supplied to the second electrode of the first reset switch and the second potential supplied to the second electrode of the third reset switch.

16. An image sensor according to claim 10; wherein the first amplifier and the second amplifier are controlled to start amplifying a fixed time period before an image signal of the light receiving element which is arranged in a first stage of the image sensor starts to be output.

17. An image sensor according to claim 10; wherein the first amplifier and the second amplifier are controlled to finish amplifying after the operation of outputting an image signal of the light receiving element which is arranged in a final stage of the image sensor has been completed, and then the light receiving element is controlled to return to the initial state.

18. An image sensor according to claim 10; further comprising a dummy output system comprising a dummy photodiode acting as a dummy element, a third dummy amplifier for amplifying a signal output by the dummy photodiode, a fourth reset switch for returning the state of the dummy photodiode back to an initial state, a fourth dummy amplifier, a chip selecting switch for selectively activating the fourth dummy amplifier, and a fifth reset switch having a second electrode fixed to the second potential to which the output of the fourth dummy amplifier is reset to an initial state; wherein the fourth reset switch is temporarily closed when the fifth reset switch outputs the initial electric potential during the operation of resetting the dummy photodiode to a dummy signal output terminal and which is opened or closed so that the potential of the dummy signal output terminal is rapidly brought close to the initial electric potential.

19. An image sensor according to claim 18; wherein a potential at a first electrode of the dummy photodiode is fixed; a second electrode of the dummy photodiode is connected to an input terminal of the third dummy amplifier; and an output terminal of the third dummy amplifier is connected to an input terminal of the fourth dummy amplifier.

20. An image sensor according to claim 18; wherein the photodiode acting as the light receiving element and the dummy photodiode comprise identical components, the first amplifier and the third dummy amplifier comprise identical circuits, the first reset switch and the fourth reset switch comprise identical switches, and the third reset switch and the fifth reset switch comprise identical switches.

\* \* \* \* \*